United States Patent
Bosch et al.

(10) Patent No.: US 11,795,306 B2
(45) Date of Patent: Oct. 24, 2023

(54) POLYMER BASED VULCANIZATION COMPOSITIONS AND METHOD FOR PREPARING THE COMPOSITIONS

(71) Applicant: Rubber Nano Products (Proprietary) Limited, Port Elizabeth (ZA)

(72) Inventors: Robert Michael Bosch, Port Elizabeth (ZA); Damian Williams, Port Elizabeth (ZA)

(73) Assignee: Rubber Nano Products (Proprietary) Limited, Port Elizabeth (ZA)

( * ) Notice: Subject to any disclaimer, the term of this patent is extended or adjusted under 35 U.S.C. 154(b) by 346 days.

(21) Appl. No.: 16/964,098

(22) PCT Filed: Jan. 11, 2019

(86) PCT No.: PCT/IB2019/050218
§ 371 (c)(1),
(2) Date: Jul. 22, 2020

(87) PCT Pub. No.: WO2019/145808
PCT Pub. Date: Aug. 1, 2019

(65) Prior Publication Data
US 2021/0032440 A1    Feb. 4, 2021

(30) Foreign Application Priority Data
Jan. 24, 2018 (NL) ...................... 2020311

(51) Int. Cl.
*C08L 7/00* (2006.01)
*C08J 3/205* (2006.01)
*C08J 3/22* (2006.01)
*C08J 3/24* (2006.01)
*C08L 9/06* (2006.01)
*C08L 71/02* (2006.01)

(52) U.S. Cl.
CPC ............... *C08L 7/00* (2013.01); *C08J 3/2053* (2013.01); *C08J 3/226* (2013.01); *C08J 3/241* (2013.01); *C08L 9/06* (2013.01); *C08L 71/02* (2013.01); *C08J 2309/06* (2013.01); *C08J 2429/04* (2013.01); *C08J 2471/02* (2013.01)

(58) Field of Classification Search
CPC .... C08L 7/00; C08L 9/06; C08L 71/02; C08J 3/2053; C08J 3/226; C08J 3/241; C08J 2309/06; C08J 2429/04; C08J 2471/02
See application file for complete search history.

(56) References Cited

U.S. PATENT DOCUMENTS

| | | |
|---|---|---|
| 10,920,036 B2 | 2/2021 | Lieber et al. |
| 2016/0272806 A1 | 9/2016 | Kudo et al. |
| 2017/0298195 A1 | 10/2017 | Bosch et al. |

FOREIGN PATENT DOCUMENTS

| | | |
|---|---|---|
| DE | 3401843 | 7/1985 |
| DE | 19754341 | 7/1999 |
| WO | WO 2016042524 | 3/2016 |

OTHER PUBLICATIONS

PCT International Search Report in International Application No. PCT/IB2019/050218, dated May 16, 2019, 2 pages.

*Primary Examiner* — Edward J Cain
(74) *Attorney, Agent, or Firm* — Fish & Richardson P.C.

(57) ABSTRACT

This invention relates to a composition which is suitable for use in the vulcanization of the rubber. The composition is a non-aqueous water soluble polymer based composition comprising a cationic silicate component. The composition may further include a second cationic additive component which is desirable in a rubber vulcanization process. The invention further relates to a method for preparing these compositions.

20 Claims, 4 Drawing Sheets

POLYMER BASED VULCANIZATION COMPOSITIONS AND METHOD FOR PREPARING THE COMPOSITIONS

CROSS-REFERENCE TO RELATED APPLICATION

This application is a National Stage Application under 35 U.S.C. § 371 and claims the benefit of International Application No. PCT/IB2019/050218, filed Jan. 11, 2019, which claims priority to NL Application No. 2020311, filed Jan. 24, 2018, the disclosure of which is incorporated herein by reference.

INTRODUCTION

This invention relates to a composition which is suitable for use in the vulcanization of the rubber. The composition is a non-aqueous water soluble polymer based composition comprising a cationic silicate component, in particular, but not exclusively, the composition may further include a second cationic component desirable in a rubber vulcanization process. The invention further relates to a method for preparing the compositions.

BACKGROUND

Activators and accelerators play an important part in the vulcanization of rubber, and together with the other components in the specific cure package, the activator and accelerator determines, to a large extent, the reaction kinetics of the vulcanization process. The specific activator and accelerator, or blend of these compounds, used in the vulcanization of rubber imparts on the final product the specific properties that are required for the particular intended application.

The accelerator sodium 2-mercaptobenzothiazoie (NaMBT) is currently used in the vulcanization of latex rubber. The sodium 2-mercaptobenzothiazole (NaMBT) material used in this process is a liquid at room temperature and is very water soluble. This liquid material is also caustic and is therefore difficult to handle in a solid state rubber mixing environment.

While known liquids are water soluble and caustic, other accelerators of well-known accelerator classes such as dithiocarmates, thiuram sulphides, dithiophosphates are available in solid powder forms. However, it is a known shortcoming of these materials that they are extremely hygroscopic, thereby leading to difficulties in the handling, storage and use thereof. Particular examples of these accelerators include zinc dibenzyldithiocarbamate (ZBEC), zinc dialkyldithiophosphate (ZBOP), and tetrabenzyl thiuramdisulfide (TBzTD).

The applicant's own WO 2016/042524 addresses these particular shortcomings by disclosing non-caustic, non-hygroscopic compositions which comprise salt of a vulcanization accelerator material, a solid particulate substrate, and a hydrophobic carrier material.

The inventor has now surprisingly found that a cationic silicate component in a water soluble polymer has unexpected vulcanization performance in terms of cure rate and rubber properties in the manufacture of rubber. It has further been found that the cationic silicate/polymer composition acts as a carrier system for the incorporation of further cationic materials, for example accelerator salt complexes or nanopowders, with these systems providing unexpected, synergistic effects in the vulcanization of rubber.

SUMMARY OF THE INVENTION

According to a first aspect to the present invention there is provided a composition, suitable for use in the vulcanization of rubber, wherein the composition comprises a polymer based solution of a cationic silicate component, and wherein the polymer is a water soluble polymer.

In another embodiment, the composition further comprises a cationic additive component.

In one embodiment, the cationic additive component is a salt of a vulcanization accelerator.

In a preferred embodiment, the vulcanization accelerator is selected from a group of accelerator classes including thiazoles, dithiocarbamates, dithiophosphates, sulfenamides, thiuram sulfides, xanthates, guanidines, aldehyde amines, or combinations thereof.

Preferably, the vulcanization accelerator is selected from a group of accelerator classes including thiazoles, dithiocarbamates, dithiophosphates, thiuram sulphides, or combinations thereof.

In one embodiment, the salt of a vulcanization accelerator is a salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Di-isopropyl xanthogen disulphide (DIXD) or polysulfide (AS100), or combinations thereof.

In one embodiment, the salt of the vulcanization accelerator is a sodium or potassium salt thereof.

In one embodiment, the cation of the cationic silicate component is a sodium or potassium cation.

In a preferred embodiment, the cation of the cationic silicate component and the cationic additive component is the same.

In one embodiment, the water soluble polymer is an ethylene oxide polymer or polyvinyl alcohol polymer.

In a preferred embodiment, the water soluble polymer is polyethylene glycol.

In another embodiment, the water soluble polymer has a molecular weight of between 300 g/mol and 10,000,000 g/mol, preferably between 500 and 20,000 g/mol, more preferably between about 1,000 and 10,000 g/mol.

According to a second aspect to the present invention there is provided a method of preparing a composition suitable for use in the vulcanization of rubber, the method comprising the steps of:

a1) providing a solution comprising a cationic silicate component,
b) adding a water soluble polymer to the solution of step (a1) to provide a mixture, and
c) drying the mixture, thereby to provide a water soluble polymer based composition comprising the cationic silicate component.

In one embodiment, the method further comprises the steps of:

a2) providing a solution of a cationic additive component, and
a3) mixing the solutions of steps (a1) and (a2) together to provide a mixture, before proceeding with steps (b) and (c), or adding the solution of step (a2) to the mixture prepared in step (b) before proceeding to step (c).

In one embodiment, the cationic additive component is a salt of a vulcanization accelerator selected from a group of accelerator classes including thiazoles, dithiocarbamates, dithiophosphates, sulfenamides, thiuram sulfides, xanthates, guanidines, aldehyde amines, or combinations thereof.

In one embodiment, the vulcanization accelerator is selected from a group of accelerator classes including thiazoles, dithiocarbamates, dithiophosphates, thiuram sulphides, or combinations thereof.

Preferably, the salt of a vulcanization accelerator is a salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Di-isopropyl xanthogen disulphide (DIXD) or polysulfide (AS100), or combinations thereof.

In one embodiment, the salt of the vulcanization accelerator is a sodium or potassium salt thereof.

In one embodiment, the cation of the cationic silicate component is a sodium or potassium cation.

In a preferred embodiment, the cation of the cationic silicate component and the cationic additive component is the same.

In one embodiment, the water soluble polymer is an ethylene oxide polymer or polyvinyl alcohol polymer.

In a preferred embodiment, the water soluble polymer is polyethylene glycol.

In another embodiment, the water soluble polymer has a molecular weight of between 300 g/mol and 10,000,000 g/mol, preferably between 500 and 20,000 g/mol, more preferably between about 1,000 and 10,000 g/mol.

According to another aspect to the present invention there is provided for the use of a composition according to the present invention as a rubber formulation cure coactivator.

BRIEF DESCRIPTION OF THE DRAWINGS

The invention will now be described in more detail with reference to the following non-limiting embodiments and figures in which.

DETAILED DESCRIPTION OF A PREFERRED EMBODIMENT

Figure 1:
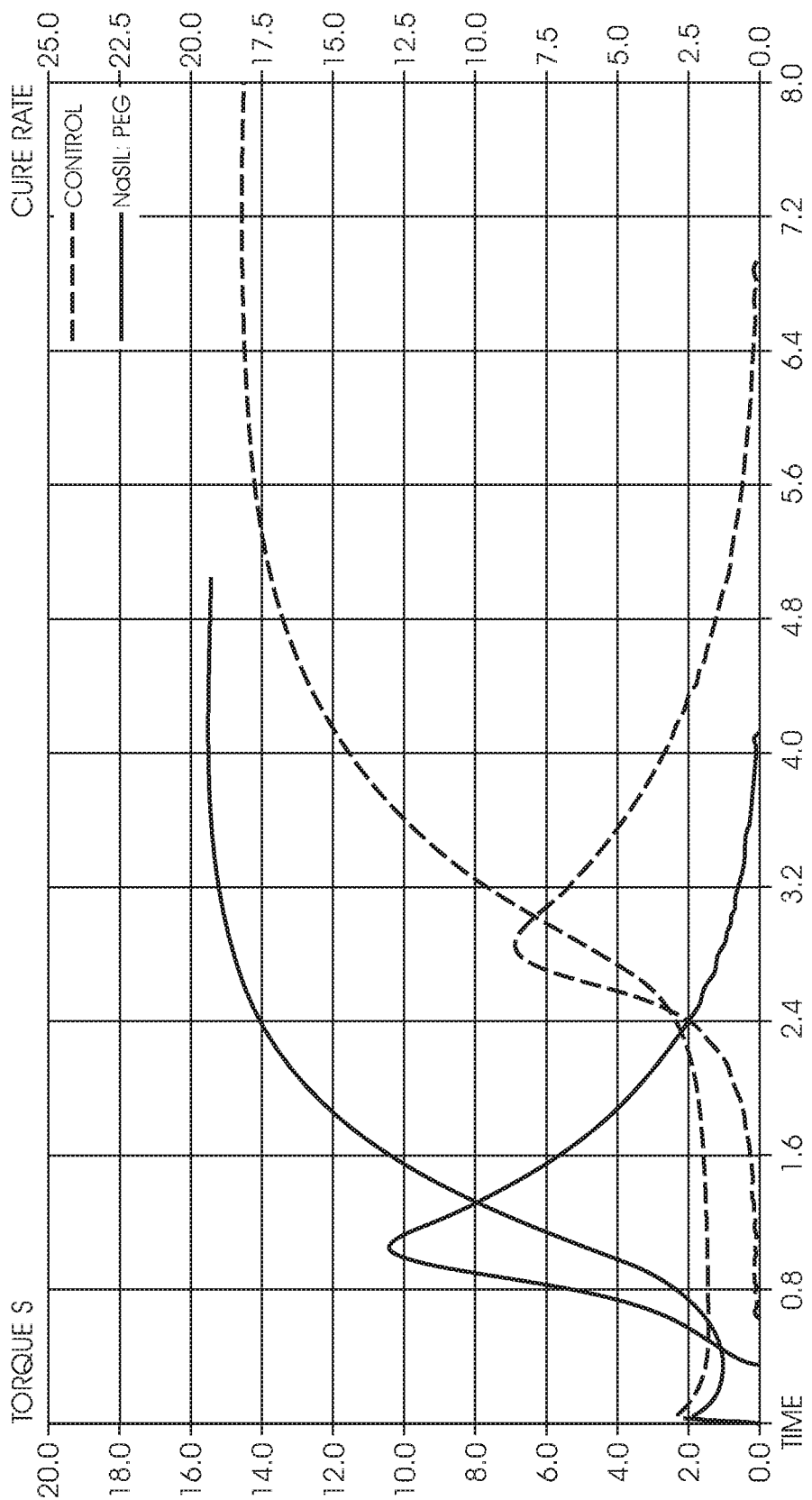
FIG. 1 shows total cure and cure rate graphs for a control sample and a NR masterbatch to which 1 phr of a NaSil-PEG has been added.

The present invention will now be described more fully hereinafter with reference to the accompanying figures, in which some of the non-limiting embodiments of the invention are shown.

The invention as described hereinafter should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, are meant to encompass the items listed thereafter, and equivalents thereof as well as additional items.

As used in this specification, the term "water soluble polymer" should be understood to mean a polymer that dissolves, disperses, or swells in water including polymers comprising hydroxyl groups, for example an ethylene oxide type polymer or a polyvinyl alcohol polymer.

The present invention provides for a water soluble polymer based composition comprising a cationic silicate component which can be used in the vulcanization of rubber. The composition may further comprise a second cationic component which is a cationic additive component, dissolved in and stabilised by the cationic silicate-polymer composition. These compositions have shown surprising and unexpected results in the vulcanization of various rubber systems.

The second cationic component, or cationic additive component, may be any known cationic material used in the vulcanization of rubber, for example a metal salt of metal oxide, such as zinc oxide, the cationic salt of a known vulcanization accelerator, or cationic nanopowders, such as reduced graphene oxide.

The salt of the vulcanization accelerator may be selected from a group of accelerator classes including thiazoles, dithiocarbamates, dithiophosphates, sulfenamides, thiuram sulfides, xanthates, guanidines, aldehyde amines, or combinations thereof.

The composition according to the present invention provides for a non-aqueous polymer based composite material that results in either an oil or frozen wax material that is suitable for direct addition to rubber-like materials in normal mixing equipment in a standard rubber manufacturing environment. The polymer is a water soluble polymer, for example an ethylene oxide type polymer, a polyvinyl alcohol polymer, or any other polymer comprising hydroxyl groups. Therefore, the composition according to the present invention, allows for the dosing of essentially caustic polar accelerator salt materials in an easy and safe manner.

Furthermore, the inventors have shown that the synergism of the carrier system is demonstrable with rubber vulcanization kinetics, having a significant impact on curing kinetics and the properties of the materials produced when utilising the composition. As is evidenced by the embodiments discussed in more detail below, the addition of a second cationic additive component to the cationic silicate-polymer composition, now acting in part as an ionic liquid carrier system, has an unexpected synergistic or additive effect on the cure parameters in standard rubber masterbatch formulations.

The invention may now be further described with reference to the main steps of preparing the water soluble polymer based vulcanization composition. A suitable cationic silicate component solution is synthesized by dissolving silica powder in a basic solution, for example sodium hydroxide or potassium hydroxide. The resultant cationic silicate component may be added to a water soluble polymer, for example an ethylene oxide polymer including polyethylene glycol, and dried to produce a stable ionic solution or ionic liquid of the particular cationic silicate component.

The particular combination of the cation silicate component and the polymer, for example polyethylene glycol, as a replacement for the aqueous environment, allows for a suitably stable ionic solution. This has the implication of allowing it greater reaction capability and potential as a reactive solvent media and stabiliser for further cationic additive components that are desirable in the rubber formulations to which it may be added.

It is envisaged that these cationic silicate solutions and the resultant cationic-silicate polymer compositions or complexes can be prepared by reacting different ratios of the selected cation to silica, thereby to modify the surface chemistry and the ionic nature of the solution and the resultant compositions. In one embodiment of the invention, a stoichiometric ratio of cation to silica may be used. Alternatively, this ratio may be varied depending on the requirements of the particular vulcanization system. The cationic silicate-polymer carrier composition may be suitable for the dissolution and stabilisation of several ionic materials that may be known to be useful or beneficial in the vulcanization of rubber, for example various salts or nanopowders, such graphene oxide or zinc oxide, or any other ionic material that may dissolved in or dispersed in the cationic silicate-polymer composition, being for example a non-aqueous sodium silicate or potassium silicate in polyethylene glycol.

The cationic silicate component may be prepared in water, or in a suitable azeotrope of water and alcohol, preferably water and isopropyl alcohol.

In one embodiment of the invention the composition may further comprise, as a cationic additive, the salt of a vulcanization accelerator dissolved in the cationic silicate component and polymer carrier. The accelerator salt complex may be prepared in a caustic aqueous solution, for example a solution of sodium hydroxide or potassium hydroxide. The accelerator salt complex may be prepared by dissolving sodium hydroxide or potassium hydroxide in water before reaction with the accelerator fragment.

The accelerator salt complex may also be prepared in a suitable azeotrope of water and alcohol. In a preferred method of the present invention, the accelerator salt complex is prepared in a water isopropyl alcohol azeotrope mixture.

The accelerator component may be selected from any one of the accelerators known in the art, in particular the accelerator may be selected from a group of accelerator classes including thiazoles, dithiocarbamates, dithiophosphates, sulfenamides, thiuram sulfides, xanthates, guanidines, aldehyde amines, or combinations thereof.

In one embodiment, the accelerator may selected from a group of accelerator classes including thiazoles, dithiocarbamates, dithiophosphates, thiuram sulphides, or combinations thereof. Preferably, the salt of a vulcanization accelerator is a sodium or potassium salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Di-isopropyl xanthogen disulphide (DIXD) or polysulfide (AS100), or combinations thereof.

The accelerator salt solution, or any other suitable ionic material such as metal salts, metal oxides, or nanopowders, is added to the cationic silicate solution to prepare a reaction mixture to which the water based polymer is added. The resultant reaction mixture is then dried to remove the solution medium, in particular to remove any water from the system. In one embodiment, the mixture may be dried under vacuum, for example at 100 mBar or less, to remove the solution medium. The resultant composition is a non-aqueous composition which is based on the water soluble polymer, for example polyethylene glycol. This non-aqueous composition is suitable for simple direct addition to solid, nonpolar rubber systems. The composition comprises a single phase with no layers of separation (organic or aqueous).

In one embodiment, the combination of the second cationic additive component, for example the accelerator salt complex, and the cationic silicate component may be selected so that the cation portion of the additive component and silicate component of the composition are the same, although different combinations may also be selected.

The cationic additive component and the cationic silicate component may comprise about 50% of the total mass of the polymer based composition, with the water based polymer component making up the rest of the composition.

The invention will now be described in more detail with reference to the following, non-limiting, examples and experimental results.

Example 1: Sodium Silicate/Polyethylene Glycol Complex and Use Thereof in a NR Rubber Composition In a suitable vessel 10 g of NaOH was added into 40 mL of water. To this solution, 7.5 g of silica powder was added while stirring. The solution was heated to 60° C. and the dissolution was seen to be rapid (the reaction is exothermic so not much heating is required). The solution was stirred for 5 minutes at 60° C. This solution is clear once the reaction of NaOH and $SiO_2$ is completed.

$$2NaOH + SiO_2 \rightarrow Na_2SiO_3\ (aq) + H_2O$$

The sodium silicate solution can also be prepared in a suitable azeotrope, for example a water and isopropyl alcohol mixture.

15 g of polyethylene glycol was added to this solution where the amount of PEG is normally the same mass as the silicate content. The solution was stirred for 5 minutes at 60° C. until all the PEG is dissolved in the solution. The solution was dried at 105° C., at less than 100 mBar resulting in an amber clear sodium silicate-PEG composition.

The composition was tested against a control sample by adding 1 phr of the sodium silicate-PEG composition to a 155 phr masterbatch NR (NR SMR GP, Carbon black n330, oil). As can be seen from FIG. 1, this example shows that a 1 phr dosing of the sodium silicate-PEG composition reduced the $TC_{90}$ from about 4.7 minutes to about 2.4 minutes.

| Compound | Batch | Lot | Remark | S'Max | S'Min | Scorch Time (TS1) | Scorch Time (TS2) | TC 10 | TC 90 | Time to Peak Rate (S') | Peak Rate (S'/min) | Peak Rate (S'/sec) |
|---|---|---|---|---|---|---|---|---|---|---|---|---|
| COA 150 | NaSIL-PEG | 1 phr | Cotrol | 14.55 | 1.42 | 2.43 | 2.65 | 2.52 | 4.67 | 2.85 | 8.66 | 0.14 |
| COA 150 | NaSIL-PEG | 1 phr | 1 phr | 15.50 | 1.03 | 0.75 | 0.89 | 0.82 | 2.40 | 1.05 | 13.08 | 0.22 |

Example 2: Sodium Mercaptobenzothiazole (NaMBT), Sodium Silicate, Polyethylene Glycol In a suitable vessel 10 g of NaOH was added into 20 mL of water. In an alternative embodiment, 100 mL of an 87.7% by weight IPA azeotropic solution was used. 41.8 g of mercaptobenzothiazol (MBT) powder was added into the aqueous solution at a temperature of 50° C. A clear amber liquid was formed.

$$NaOH + MBT \rightarrow NaMBT\ (aq) + H_2O$$

| Synthesis of NaMBT | mass | mole ratio | |
|---|---|---|---|
| NaOH | 39.9997 | 10.00 | 1 |
| MBT | 167.25 | 41.81 | 1 |
| Water | 18.02 | 20.00 | 1 |
| NaMBT | 189.2297 | 20.16 | 1 |

In a suitable vessel 10 g of NaOH was added into 40 mL of water. To this solution, 7.5 g of silica powder was added while stirring. The solution was heated to 60° C. and the dissolution was seen to be rapid (the reaction is exothermic so not much heating is required). The solution was stirred for 5 minutes at 60° C. This solution is clear once the reaction of NaOH and SiO₂ is completed.

$$2NaOH + SiO_2 \rightarrow Na_2SiO_3\ (aq) + H_2O$$

| Synthesis of Nasilicate | | | |
|---|---|---|---|
| | MW | Mass | Mole ratio | moles |
| NaOH | 39.997 | 10.00 | 2 | 0.2500 |
| SiO2 | 60.08 | 7.51 | 1 | 0.1250 |
| Water | 18.02 | 40.00 | | |
| NaSILIC | 122.06 | 15.26 | 1 | 0.1250 |

The sodium silicate and NaMBT solutions were combined under mixing before 30.4 g of polyethylene glycol (PEG 1000) was added to the mixture. The mixture was dried at 105° C., 100 mBar resulting in an amber clear sodium silicate-NaMBT-PEG composition.

Figure 2:
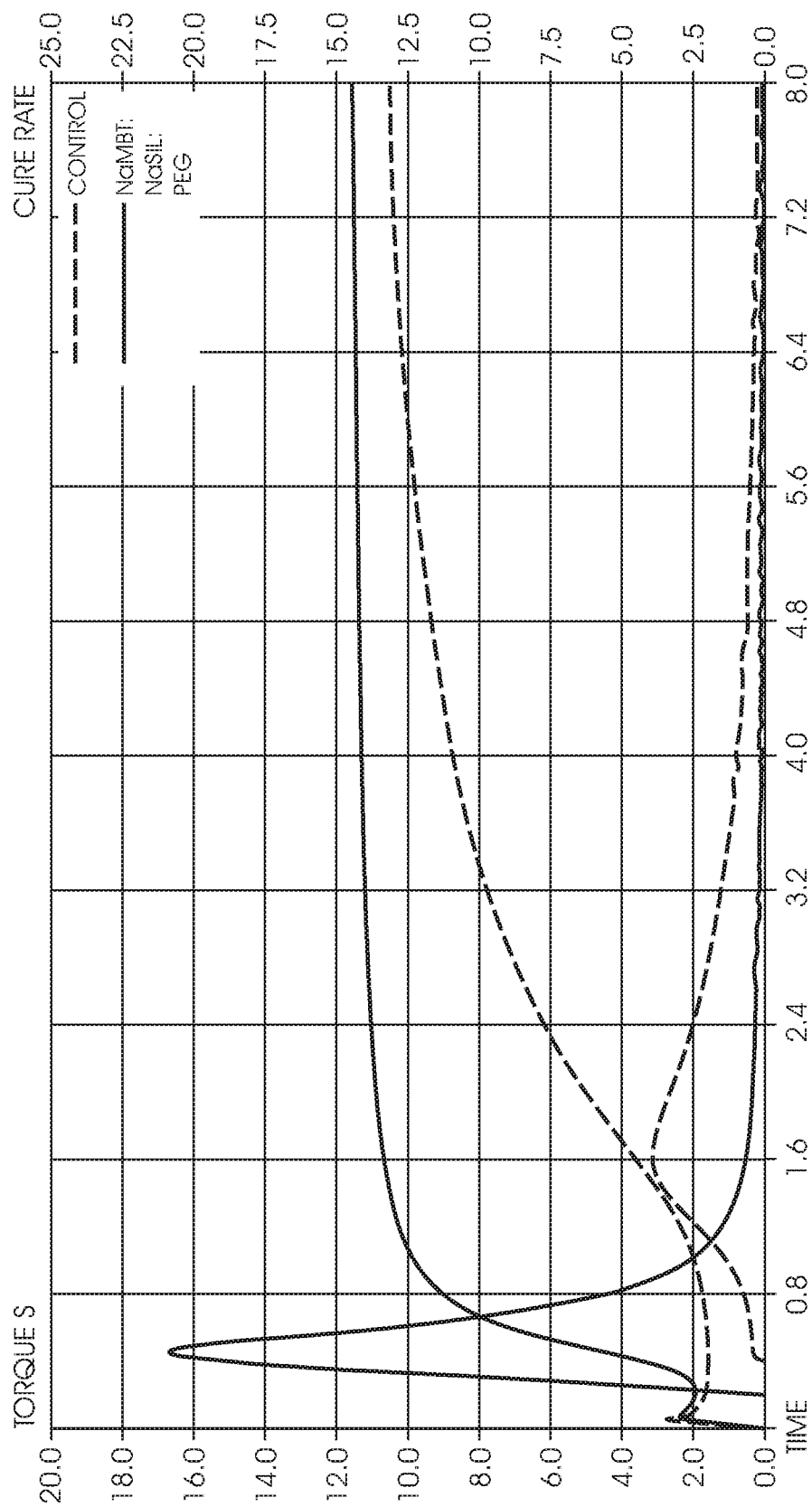
FIG. 2 shows total cure and cure rate graphs for a control sample and a SBR masterbatch to which 1 phr of the NaMBT-NaSil-PEG has been added.

FIG. 2 shows a rheo trace graph that demonstrates the effect of adding 1 phr of the NaMBT-NaSil-PEG composition into a SBR masterbatch cured using ZBEC. The analysis was performed on on Montech MDR3000 Professional using standard 0.5 arc and 1.67 Hz. SBR (170.3 phr total MBT, Carbon black, SBR 1502, oil), Cure package (1.2 ZBEC, 1.6 S8, 1.0 ZnO), Addition of 1 phr of NaMBT-NaSil-PEG composition.

As can been seen from FIG. 2, the introduction of 1 phr of the NaMBT-NaSil-PEG composition to a typical SBR masterbatch provides a significant improvement cure performance. The TC$_{90}$ value decreased from about 7.2 minutes in the control sample to about 1.5 minutes, while the time to peak rate (S') decreased from about 1.6 minutes to about 0.44 minutes.

Example 3: Sodium Dibenzyl Dithiocarbamate (NaBEC), Sodium Silicate, Polyethylene Glycol The overall reaction is performed in two parts. Firstly, ZBEC is dissolved in excess NaOH solution then balanced with silica. Secondly, the solution is added to a sodium silicate/PEG solution and dried.

In a suitable vessel dissolve NaOH into 30 mL of water (or into greater volume of water/IPA azeotropic solution) add the two allotments (10 g and 20 g) of NaOH together (excess NaOH is required to dissolve the ZBEC).

Then under mixing add ZBEC powder into the aqueous solution. Preferably, the addition is done under shear mixing. Solid white powder will form (ZnO) and a layer of oily NaBEC may form on the surface of the solution.

Once all the ZBEC is dissolved the residual silica is added into the solution.

$$6NaOH + ZBEC + 2SiO_2 \rightarrow 2Na_2SiO_3\ (aq) + 2NaBEC + ZnO + 3H_2O$$

| Synthesis of NaBEC | | mole ratio | Mol | mass |
|---|---|---|---|---|
| NaOH | 39.9997 | 2 | 0.25 | 10.00 |
| ZBEC | 610 | 1 | 0.13 | 76.25 |
| Water | 18.02 | 1 | 0.13 | 30.00 |
| NaBEC | 295.2857 | 2 | 0.25 | 73.82 |
| ZnO | 81.408 | 1 | 0.13 | 10.18 |
| Extra NaOH | 39.9997 | 4 | 0.50 | 20.00 |
| Extra silica balance | 60.08 | 2 | 0.25 | 15.02 |
| NaSilicate extra | 122.06 | 2.00 | 0.25 | 30.52 |

For the formation of a sodium silicate solution 10 g of NaOH was added into 40 mL of water. The silica powder (7.5 g) was added stepwise under shear mixing. The solution was heated at [add temp] for [add time], with observed dissolution being rapid. The solution is clear when completed.

$$2NaOH + SiO_2 \rightarrow Na_2SiO_3\ (aq) + H_2O$$

| Synthesis of Nasilicate | | | | |
|---|---|---|---|---|
| | MW | Mass | Mole ratio | moles |
| NaOH | 39.997 | 10.00 | 2 | 0.2500 |
| SiO2 | 60.08 | 7.51 | 1 | 0.1250 |
| Water | 18.02 | 40.00 | | |
| NaSILIC | 122.06 | 15.26 | 1 | 0.1250 |

| Compound | Batch | Lot | Remark | S'Max | S'Min | Scorch Time (TS1) | Scorch Time (TS2) | TC 10 | TC 90 | Time to Peak Rate (S') | Peak Rate (S'/min) | Peak Rate (S'/sec) |
|---|---|---|---|---|---|---|---|---|---|---|---|---|
| SBR 170 | SBR Sava | Control | ZBEC | 11.33 | 1.56 | 1.29 | 1.58 | 1.28 | 7.18 | 1.62 | 3.84 | 0.06 |
| SBR 170 | SBR Sava | A | NaMBT added | 11.58 | 1.89 | 0.35 | 0.41 | 0.34 | 1.47 | 0.44 | 20.87 | 0.35 |

The sodium silicate and NaBEC solutions were combined under mixing before 119.6 g of polyethylene glycol (PEG 1000) was added to the mixture. The mixture was dried at 110° C., 100 mBar resulting in an amber clear sodium silicate-NaBEC-PEG composition solution (oil) that will harden into a PEG wax over time.

|  | mass | percentage |
| --- | --- | --- |
| NaSIL | 45.77 | 19.14% |
| NaBEC | 73.82 | 30.86% |
| PEG 1000 | 119.6 | 50.00% |
|  | 239.1917 | |

Example 4: Potassium Mercaptobenzothiazole (KMBT), Potassium Silicate, Polyethylene Glycol In a suitable vessel 6 g of KOH was added into 20 mL of water. In an alternative embodiment, 100 mL of a an 88% by weight IPA azeotropic solution was used. 17.9 g of mercaptobenzothiazol (MBT) powder was added into the aqueous solution at a temperature of 50° C. under shear mixing. A clear amber liquid was formed.

$KOH + MBT \rightarrow KMBT\ (aq) + H_2O$

| Synthesis of KMBT | | |
| --- | --- | --- |
| KOH | 56.1056 | 6.00 |
| MBT | 167.25 | 17.89 |
| Water | 18.02 | 20.00 |
| KMBT | 205.3356 | 21.88 |

In a suitable vessel 10 g of NaOH was added into 40 mL of water. To this solution, 7.5 g of silica powder was added while stirring. The solution was heated to 60° C. and the dissolution was seen to be rapid (the reaction is exothermic so not much heating is required). The solution was stirred for 5 minutes at 60° C. This solution is clear once the reaction of NaOH and $SiO_2$ is completed.

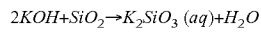

$2KOH + SiO_2 \rightarrow K_2SiO_3\ (aq) + H_2O$

| Synthesis of K silicate | | | |
| --- | --- | --- | --- |
|  | MW | Mass | Ratio |
| KOH | 56.1056 | 10.00 | 2 |
| SiO2 | 60.08 | 5.35 | 1 |

| Synthesis of K silicate | | | |
| --- | --- | --- | --- |
|  | MW | Mass | Ratio |
| Water | 18.02 | 100.00 | 1 |
| Ksil | 154.28 | 13.75 | 1 |

The potassium silicate and KMBT solutions were combined under mixing before 35.6 g of polyethylene glycol (PEG 1000) was added to the mixture. The mixture was dried at 105° C., 100 mBar resulting in an amber clear sodium silicate-NaMBT-PEG composition.

|  | mass | percentage |
| --- | --- | --- |
| KSil | 13.75 | 19.30% |
| KMBT | 21.88 | 30.70% |
| PEG 1000 | 35.63 | 50.00% |
|  | 71.26 | 100.00% |

Example 5: Sodium Mercaptobenzothiazole (NaMBT), Sodium Silicate, Polyethylene Glycol Complex Comprising Reduced Graphene Oxide Powder (rGO)

Reduced graphene oxide powder (rGO) was dissolved into a NaMBT-NaSil-PEG composition according to the present invention.

Reduced Graphene oxide (rGO) is provided from manufacturers as a dry powder or in aqueous suspension. It was added as provided into the solution of the $NaMBT-Na_2SIO_3$-PEG solution before drying. The amount of rGO used is chosen to allow a certain amount of the active PEG-$Na_2SIO_3$, i.e. 10% of the active mixture to 90% by mass rGO.

Figure 3:
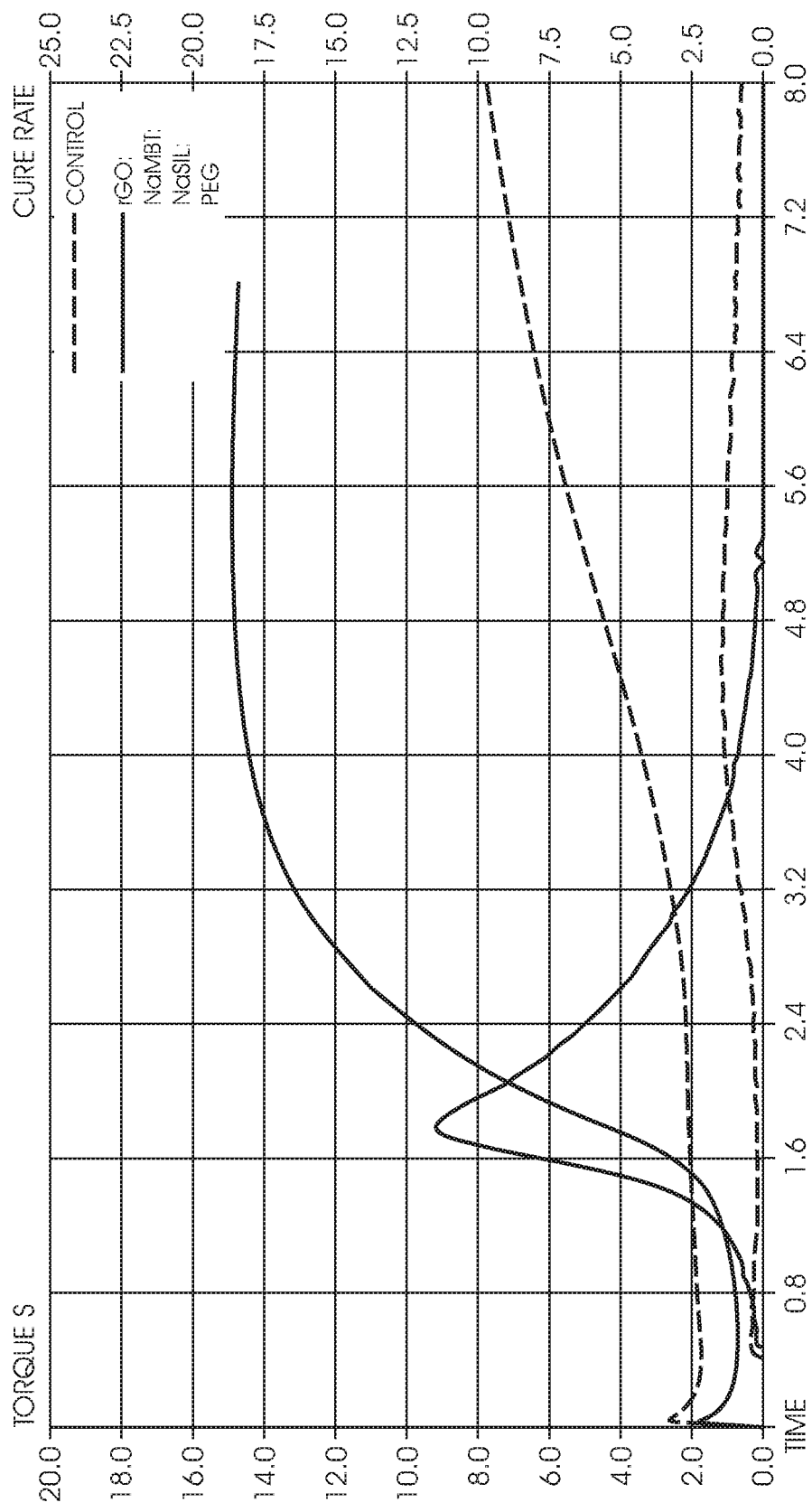
FIG. 3 shows total cure and cure rate graphs for a control sample and a SBR masterbatch to which a NaMBT-NaSil-PEG complex containing graphene oxide was added at 1 phr.

FIG. 3 shows a graph of the effect of cure performance when a rGO-NaMBT-NaSil-PEG composition is dosed at 1 phr into a SBR masterbatch formulation. Masterbacth: SBR (170.3 phr total MBT, Carbon black, SBR 1502, oil), Cure package: (1.2 ZBEC, 1.6 S8, 1.0 ZnO), Addition of 1 phr of rGO-NaBEC complex. This reaction works with both the NaMBT or NaBEC form.

The effect of rGO is more modulus is apparent in the cure system. In the data below we can easily see that the S'Max (torque of the compound) is substantially higher in the active rGO formulation (14.92>10.51) and this is a rather large increase in modulus. Further physical testing will demonstrate some of the improvements of modulus.

| Compound | Batch | Lot | Remark | S'Max | S'Min | Scorch Time (TS1) | Scorch Time (TS2) | TC 10 | TC 90 | Time to Peak Rate (S') | Peak Rate (S'/min) | Peak Rate (S'/sec) |
| --- | --- | --- | --- | --- | --- | --- | --- | --- | --- | --- | --- | --- |
| COA 150 | Activ8 rGO | dev | actives | 14.92 | 0.69 | 1.45 | 1.62 | 1.53 | 3.33 | 1.80 | 11.45 | 0.19 |
| COA 150 | 7 Actives | Oct | Control | 10.51 | 1.71 | 3.38 | 4.23 | 3.24 | 11.59 | 4.60 | 1.42 | 0.02 |

Example 6: The Use of Sodium Dibenzyl Dithiocarbamate (NaBEC), Sodium Silicate, Polyethylene Glycol Complex in Rubber Composition not Comprising BEC Type Accerator In this experiment a NaBEC-NaSil-PEG composition of the invention was tested in a conveyer belt SBR system that does not contain a BEC type accelerator. It was shown that the combination of the NaBEC and sodium silicate has and activating impact even on a cure system that does not contain a BEC type accelerator. This is a new effect and there is therefore no longer a need to match the accelerator system with the reactor fragment. The synergistic effects seen with the compositions of the present invention is therefore present regardless of curative type usage.

Figure 4:
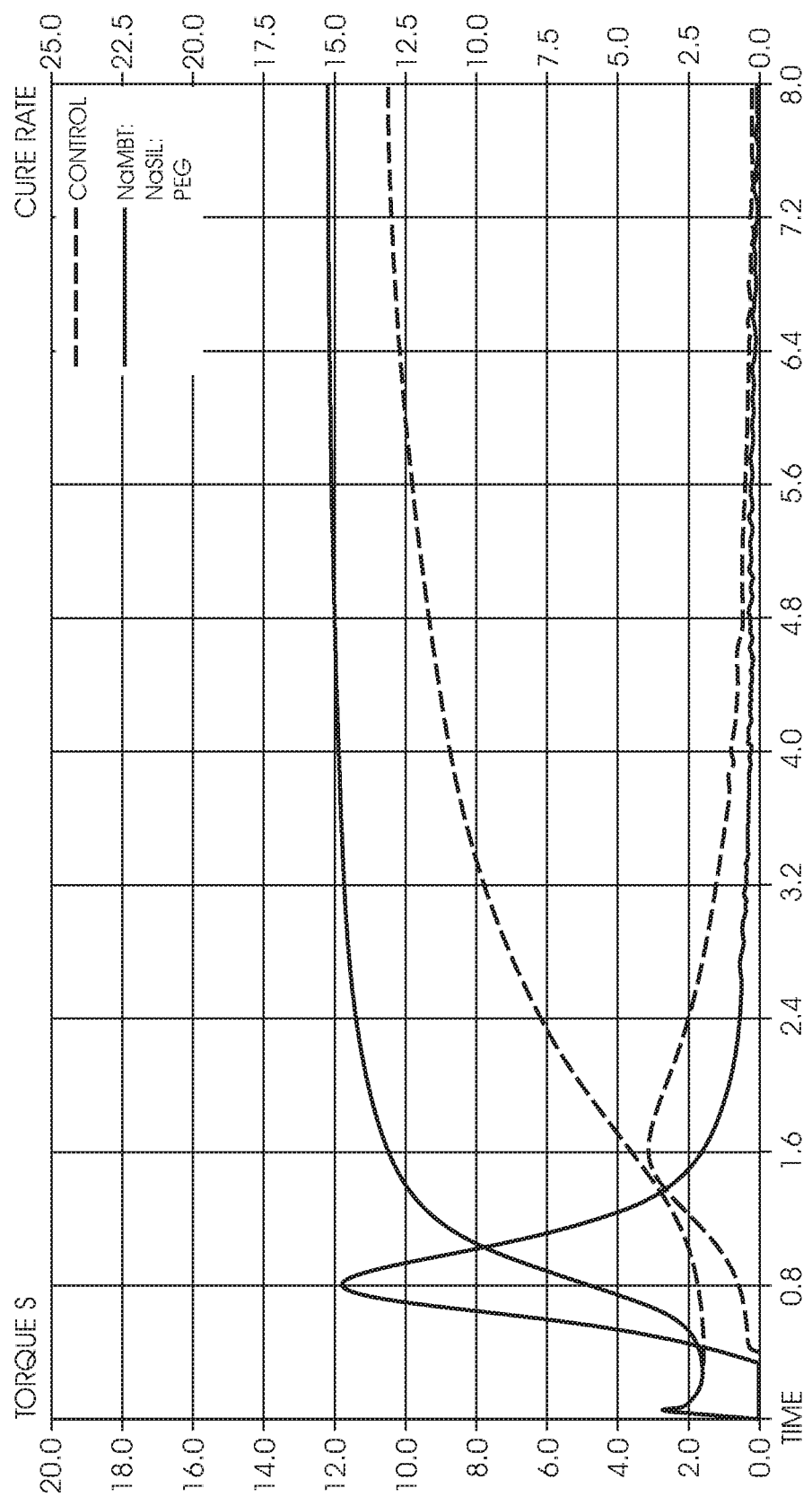
FIG. 4 shows total cure and cure rate graphs for a control sample and a SBR masterbatch to which 1 phr of the NaBEC-NaSil-PEG has been added.

FIG. 4 shows the effect of 1 phr NaBEC-NaSil-PEG composition in a conveyer belt system using SBR. The SBR masterbatch is 170.3 phr and cure package is 4 phr ZnO, 2 TBBS, 0.9 DPG and 1.8 Sulfur. As can been seen from FIG. 4, the introduction of 1 phr of this composition into a SBR masterbatch not containing a BEC type accelerator provided a significant and unexpected effect on cure performance. The $TC_{90}$ value decreased from about 7.2 minutes in the control sample to about 2.1 minutes, while the time to peak rate (S') decreased from about 1.6 minutes to about 0.8 minutes.

| Compound | Batch | Lot | Remark | S'Max | S'Min | Scorch Time (TS1) | Scorch Time (TS2) | TC 10 | TC 90 | Time to Peak Rate (S') | Peak Rate (S'/min) | Peak Rate (S'/sec) |
|---|---|---|---|---|---|---|---|---|---|---|---|---|
| SBR 170 | SBR Sava | Control | ZBEC | 11.33 | 1.56 | 1.29 | 1.58 | 1.28 | 7.18 | 1.62 | 3.84 | 0.06 |
| SBR 170 | SBR Sava | A | NaBEC | 12.24 | 1.60 | 0.61 | 0.70 | 0.61 | 2.14 | 0.79 | 14.76 | 0.25 |

This above description of some of the illustrative embodiments of the invention is to indicate how the invention can be made and carried out. Those of ordinary skill in the art will know that various details may be modified thereby arriving at further embodiments, but that many of these embodiments will remain within the scope of the invention.

The invention claimed is:

1. A rubber vulcanization composition, wherein the composition is a polymer based solution comprising a cationic silicate component wherein the cation of the cationic silicate component is a sodium or potassium cation, and wherein the polymer is a water soluble polymer selected from an ethylene oxide polymer or a polyvinyl alcohol polymer.

2. The composition according to claim 1, wherein the composition comprises a cationic additive component.

3. The composition according to claim 2, wherein the cationic additive component is a salt of a vulcanization accelerator.

4. The composition according to claim 3, wherein the vulcanization accelerator is selected from the group of accelerator classes consisting of thiazoles, dithiocarbamates, dithiophosphates, sulfenamides, thiuram sulfides, xanthates, guanidines, and aldehyde amines, or combinations thereof.

5. The composition according to claim 4, wherein the vulcanization accelerator is selected from the group of accelerator classes consisting of thiazoles, dithiocarbamates, dithiophosphates, and thiuram sulphides, or combinations thereof.

6. The composition according to claim 3, wherein the salt of a vulcanization accelerator is a salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Di-isopropyl xanthogen disulphide (DIXD) or polysulfide (AS100), or combinations thereof.

7. The composition according to claim 3, wherein the salt of the vulcanization accelerator is a sodium or potassium salt thereof.

8. The composition according to claim 2, wherein the cation of the cationic silicate component and the cation of the cationic additive component is the same.

9. The composition according to claim 1, wherein the water soluble polymer is polyethylene glycol.

10. The composition according to claim 1, wherein the water soluble polymer has a molecular weight of between 300 g/mol and 10,000,000 g/mol.

11. A method of preparing a rubber vulcanization composition, the method comprising the steps of:
   a1) providing a solution comprising a cationic silicate component wherein the cation of the cationic silicate component is a sodium or potassium cation,
   b) adding a water soluble polymer selected from an ethylene oxide polymer or a polyvinyl alcohol polymer to the mixture prepared in step (a1), and
   c) drying the mixture, thereby to provide a water soluble polymer based composition comprising the cationic silicate component.

12. The method according to claim 11, the method comprising the further steps of:
   a2) providing a solution of a cationic additive component, and
   a3) mixing the solutions of steps (a1) and (a2) together to provide a mixture, before proceeding with steps (b) and (c), or adding the solution of step (a2) to the mixture prepared in step (b) before proceeding to step (c).

13. The method according to claim 12, wherein the cationic additive component is a salt of a vulcanization accelerator selected from the group of accelerator classes consisting of thiazoles, dithiocarbamates, dithiophosphates, sulfenamides, thiuram sulfides, xanthates, guanidines, and aldehyde amines, or combinations thereof.

14. The method according to claim 13, wherein the vulcanization accelerator is selected from the group of accelerator classes consisting of thiazoles, dithiocarbamates, dithiophosphates, and thiuram sulphides, or combinations thereof.

15. The method according to claim 13, wherein the salt of a vulcanization accelerator is a salt of 2-mercaptobezothiazole (MBT), zinc dibenzyldithiocarbamate (ZBEC), zinc dialkyldithiophosphate (ZBOP), tetrabenzyl thiuramdisulfide (TBzTD), Di-isopropyl xanthogen disulphide (DIXD) or polysulfide (AS100), or combinations thereof.

16. The method according to claim 13, wherein the salt of the vulcanization accelerator is a sodium or potassium salt thereof.

17. The method according to claim 12, wherein the cation of the cationic silicate component and the cation of the cationic additive component is the same.

18. The method according to claim 11 wherein the water soluble polymer is polyethylene glycol.

19. The method according to claim 11, wherein the water soluble polymer has a molecular weight of between 300 g/mol and 10,000,000 g/mol.

20. A method of curing a rubber formulation, the method comprises utilizing a composition according to claim 1 as a rubber formulation cure coactivator.

* * * * *